April 30, 1963     O. E. McCLANAHAN     3,087,272
LIVE MINNOW FISHING LURE
Filed Jan. 26, 1962
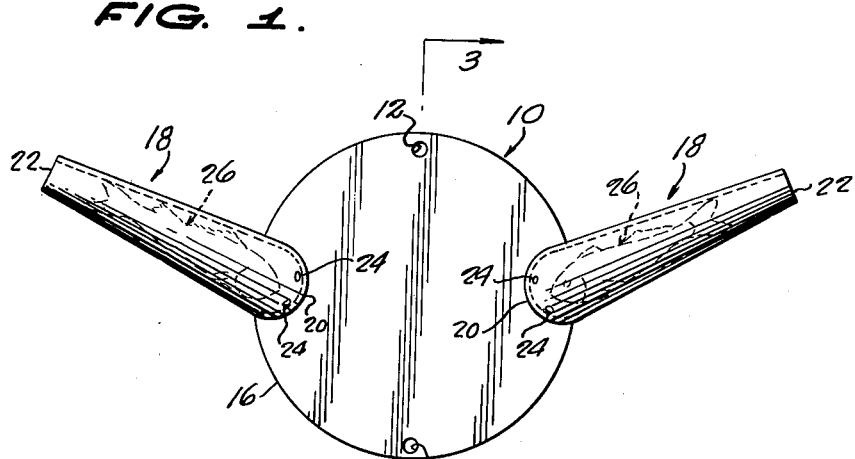
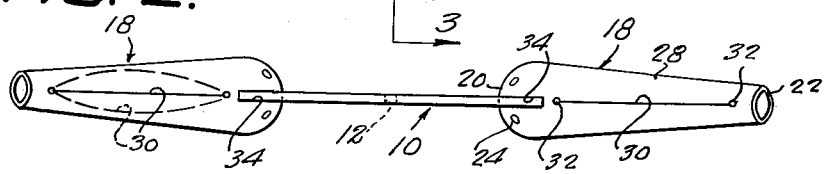
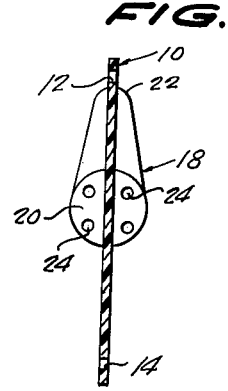
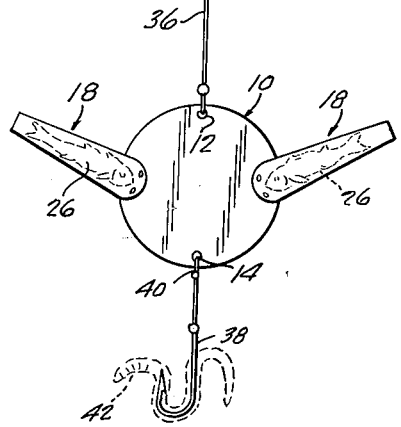
INVENTOR.
OTIS E. McCLANAHAN,
BY
*McMorrow, Berman & Davidson*
ATTORNEYS.

United States Patent Office 3,087,272
Patented Apr. 30, 1963

3,087,272
LIVE MINNOW FISHING LURE
Otis Edgar McClanahan, 416 Fairhome Ave., Clyde, Ohio
Filed Jan. 26, 1962, Ser. No. 169,069
6 Claims. (Cl. 43—41)

This invention relates to a novel live minnow fishing lure.

The primary object of the invention is the provision of a generally improved and more efficient lure of the kind indicated, which involves a greater and more effective display of live minnows, thereby providing greater attraction for fish.

Another object of the invention is the provision of a lure of the character indicated above, wherein the minnow display means comprises elongated streamlined transparent capsule means which are openable to receive and discharge minnows, and which, when closed, entirely enclose the minnows, except for water-admitting opening means, and position the minnows lengthwise of the capsule means, without unduly restricting wriggling motions of the minnows.

A further object of the invention is the provision of a lure of the character indicated above, wherein the capsule means are secured, at one end thereof, to a preferably transparent body which serves as the anchor for a fishing line leader, and for fishhook means.

Other important objects and advantageous features of the invention will be apparent from the following description and the accompanying drawings, wherein, for purposes of illustration only, a specific form of the invention is set forth in detail.

In the drawings:

FIGURE 1 is a side elevation of a lure of the present invention;

FIGURE 2 is a top plan view of FIGURE 1;

FIGURE 3 is a transverse vertical section taken on the line 3—3 of FIGURE 1;

FIGURE 4 is a schematic side elevation, on a reduced scale, showing a fishing line and a baited hook secured to the lure.

Referring in detail to the drawings, wherein like numerals designate like parts throughout the several views, the illustrated lure comprises a preferably transparent body 10, preferably in the form of a relatively thin plastic disc of circular form, having substantial rigidity. The body 10 is provided, at diametrically opposed locations, with an upper fishing line leader connecting hole 12, and a lower fishhook connecting hole 14, these holes being located close to the peripheral edge 16 of the body.

The lure further comprises a pair of similar minnow containing capsules 18, which are transparent and made of flexible plastic material. The capsules 18 are longitudinally elongated and longitudinally tapered cylinders, the taper being substantially uniform from convexly rounded inner end walls 20, to open outer ends 22. The inner end walls 20 are formed with water-admitting perforations 24, which provide adequate circulation of water through the capsules for sustaining single live minnows 26. The minnows, while being confined to longitudinal positions within the capsules, are selected to be smaller in diameter than the interiors of the capsules and shorter in length, so that the minnows can wriggle freely and realistically within the capsules, so as to attract fish to the lure, in a body of water in which the lure is used. The sidewalls 28 of the capsules are formed, in one side thereof, with longitudinal slits 30 having enlarged keyholes 32 at their ends, whereby the capsules can be deformed to spread the slits in order to admit or discharge minnows from the capsules, and released to permit the slits to close to confine minnows therein.

The capsules 18 have relatively short diametrical slots 34 which extend across their convex inner end walls 20 and portions of the sidewalls 28, and receive edge portions of the body 10, at points equally spaced from the body holes 12 and 14. The edges of the slots 34 are suitably secured to the opposite sides and the peripheral edge 16 of the body 10, with the capsules 18 disposed at similar upward angles, relative to the horizontal median line of the body, the capsules being in similar upwardly divergent obtuse angular relationship.

As indicated in FIGURE 4, use and operation of the above described lure involves attaching a fishing line leader 36 through the upper body hole 12, and attaching a fishhook 38 to the body 10, by suitable means 40, engaged through the lower body hole 14, and securing bait 42 on the hook 38. The fishing line (not shown) to which the leader 36 is secured, is then manipulated in normal fishing operations.

It will be observed that the downward convergent relationship of the capsules, toward the fishhook 38, and the wriggling of the minnows therein, makes it appear to fish, in a body of water, that live fish are swimming toward the bait 42, so that such fish are impelled to strike the hook 38.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A fishing lure comprising a transparent capsule adapted to contain a live minnow, and means for attaching a fishing line and a fishhook thereto, said capsule being longitudinally elongated and having an open end and a closed end, said closed end being provided with a water-passing hole, said attaching means comprising a disc having a peripheral edge to which the closed end of the capsule is secured, said disc having diametrically opposed holes for severally attaching a fishing line and a fishhook to the disc.

2. A fishing lure comprising a disc having a peripheral edge, and transparent capsules adapted to contain live minnows secured to the disc at its peripheral edge at locations spaced around the disc, said capsules extending outwardly of the peripheral edge of the disc in the plane of the disc, said capsules being in convergent relationship to each other.

3. A fishing lure comprising a disc having a peripheral edge, and transparent capsules adapted to contain live minnows secured to the disc at its peripheral edge at locations spaced around the disc, said capsules extending outwardly of the peripheral edge of the disc in the plane of the disc, said capsules being in convergent relationship to each other, and fishing line and fishhook attaching means on the disc in diametrically opposed relationship, the capsules converging toward the fishhook attaching means.

4. A fishing lure comprising a transparent body having a peripheral edge, said body having diametrically opposed fishing line and fishhook attaching holes adjacent to its peripheral edge, and a pair of elongated transparent capsules adapted to contain live minnows and having inner ends secured to the body at locations between the holes and extending outwardly beyond the peripheral edge of the body, said capsules extending in the plane of the body and being in convergent relation toward the fishhook attaching hole.

5. A fishing lure comprising an elongated transparent capsule adapted to contain a live minnow and having inner and out ends, said outer end being open and smaller in diameter than the girth of a minnow to be contained in the capsule, said inner end being closed by a wall having a water-passing hole therein, the side wall of the capsule being flexible and substantially imperforate and formed with a single normally closed slit adapted to be opened to admit or discharge a minnow by deforming the side wall, a disc having a free edge attached to the inner end of the capsule and extending in a plane passing through the longitudinal centerline of the capsule.

6. A fishing lure comprising an elongated transparent capsule adapted to contain a live minnow and having inner and outer ends, said outer end being open and smaller in diameter than the girth of a minnow to be contained in the capsule, said inner end being closed by a wall having a water-passing hole therein, the sidewall of the capsule being flexible and substantially imperforate and formed with a single normally closed slit adapted to be opened to admit or discharge a minnow by deforming the sidewall, a disc having a free edge attached to the inner end of the capsule and extending in a plane passing through the longitudinal centerline of the capsule, said disc having fishing line and hook attaching means at and spaced around the peripheral edge from the capsule.

References Cited in the file of this patent
UNITED STATES PATENTS

| | | |
|---|---|---|
| 2,541,847 | Van Kirk | Feb. 13, 1951 |
| 2,769,267 | Ansley | Nov. 6, 1956 |
| 2,931,123 | Jensen | Apr. 5, 1960 |